April 12, 1966     J. W. R. WILDMAN, JR     3,245,725
SOLIDS HANDLING

Filed Nov. 7, 1963     2 Sheets-Sheet 1

INVENTOR.
J. W. R. WILDMAN, JR.
BY *Young & Quigg*
ATTORNEYS

INVENTOR.
J. W. R. WILDMAN, JR.

BY Young & Quigg

ATTORNEYS 3,245,725
SOLIDS HANDLING
John Wendell Ralph Wildman, Jr., Olathe, Kans., assignor to Phillips Petroleum Company, a corporation of Delaware
Filed Nov. 7, 1963, Ser. No. 322,139
5 Claims. (Cl. 302—51)

This invention relates to handling particulate solid materials. In one aspect this invention relates to apparatus for injecting particulate solid materials into a fluid stream. In another aspect this invention relates to an improved method for suspending particulate solid materials in a flowing fluid.

It is well known that when a stream of particulate solid materials is introduced into a confined flowing stream of fluid for suspension therein and transportation thereof, erosion of the conduit confining the suspension occurs at an area shortly after the point of introduction of the particulate solid materials into the fluid under any given conditions and/or quantity of flow. Because of such erosion, the conduit must be continuously inspected and the eroded area repaired or replaced frequently. Furthermore, especially when the particulate solid materials are catalyst materials, the problem of attrition of the solids is quite extensive when injected into a flowing fluid stream.

Generally, solids are introduced into a flowing stream confined in a conduit via an elbow conduit with the outlet thereof concentric with the confining conduit and the inlet communicating with a source of particulate solid materials meeting the confining conduit at an angle of about 90 degrees. This arrangement allows the solid materials to be fed by gravity flow. When injecting solid materials into a fluid stream in this manner, the portion of the confining conduit containing the resulting suspension is subjected to extensive erosion. The erosion occurs as the solids contact the conduit and wear it away, because of nonuniform fluid flow due to blockage thereof by the elbow conduit.

In the past, attempts to prevent erosion of the conduit confining a fluid suspension of particulate solids and attrition of the solids have included variations of the flow rates and quantities of the fluid stream and the particulate solids stream; baffling the fluid-confining conduit about the point of solids injection, that is, around the elbow conduit, to streamline and make uniform the flow of fluid about the solids injector; and streamlining the path of particulate solids flow just prior to the point of injection. These attempts have not been completely satisfactory in reducing erosion of the conduit and attrition of the solids. Erosion of the conduit has been found to occur at any given set of flow conditions of either the fluid stream or the solids stream. Baffling of the elbow at the bend to give it a streamlined configuration has not been satisfactory in eliminating faster flow of fluid underneath the elbow within the fluid conduit. Also, with the elbow conduit only inserted so that the outlet is concentric with the fluid conduit, movement and off-centering of the outlet are allowed due to flow rate and temperature changes which disturb the direction of solids injection. This disturbance of the direction of solids injection tends to eject the solids toward the walls of the conduit which creates faster erosion. The streamlining and polishing of the interior of the elbow conduit to prevent attrition of the particulate solid materials has disadvantages because the solids are still contacting and bouncing against a metal surface which tends to break the solids.

Accordingly, it is an object of this invention to provide improved handling of particulate solid materials. It is another object of this invention to prolong the useful life of apparatus for handling particulate solid materials. A further object of this invention is to minimize attrition of particulate solid materials during handling. Still another object of this invention is to provide apparatus for injecting particulate solid materials into a conduit containing a stream of flowing fluid whereby erosion is minimized. A still further object of this invention is to provide a method for injecting particulate solid materials into a flowing fluid stream whereby attrition of the solids is minimized.

Other objects and advantages of this invention will be apparent upon further study of this disclosure, the drawings and appended claims.

I have now discovered several features which greatly reduce erosion of the apparatus and attrition of the solids when particulate solid materials are injected into a confined flowing fluid stream from a conduit inserted into and directed with the fluid flow.

Broadly, my invention provides apparatus for introducing particulate solid materials into a conduit confining a fluid and injecting said solids within and parallel to the flow of fluid, which comprises a first streamlined conduit extending across the interior and in alignment with the diameter of the fluid conduit and another streamlined conduit in axial alignment with the axis of said fluid conduit and communicating with said first conduit.

Further in accordance with my invention, I provide a method for introducing particulate solid materials into a flowing stream without appreciable attrition of the solid materials which comprises flowing a fluid stream through a first conduit, introducing a stream of particulate solid materials from a source outside of said fluid conduit into the center of said flowing fluid stream, whereby a bed of nonflowing particulate solid materials is maintained under the point of direction change of the incoming solid materials so that said incoming solid materials contact said bed of solids and thereby eliminate breakage of the solids.

The improved features I provide in this invention include streamlined baffling completely across the fluid conduit, an extension of the solids outlet beyond the baffling, and a reservoir for solids below the point of solids direction change within the injection conduit.

My invention is applicable in the handling of any particulate solid materials. Particularly, it finds much utility in fluidized catalytic cracking of hydrocarbons wherein large quantities of finely divided solid catalyst materials are required to be handled and the problems of erosion and solids attrition are prevalent.

My invention will now be described in detail with reference to the drawing wherein.

Figure 1:
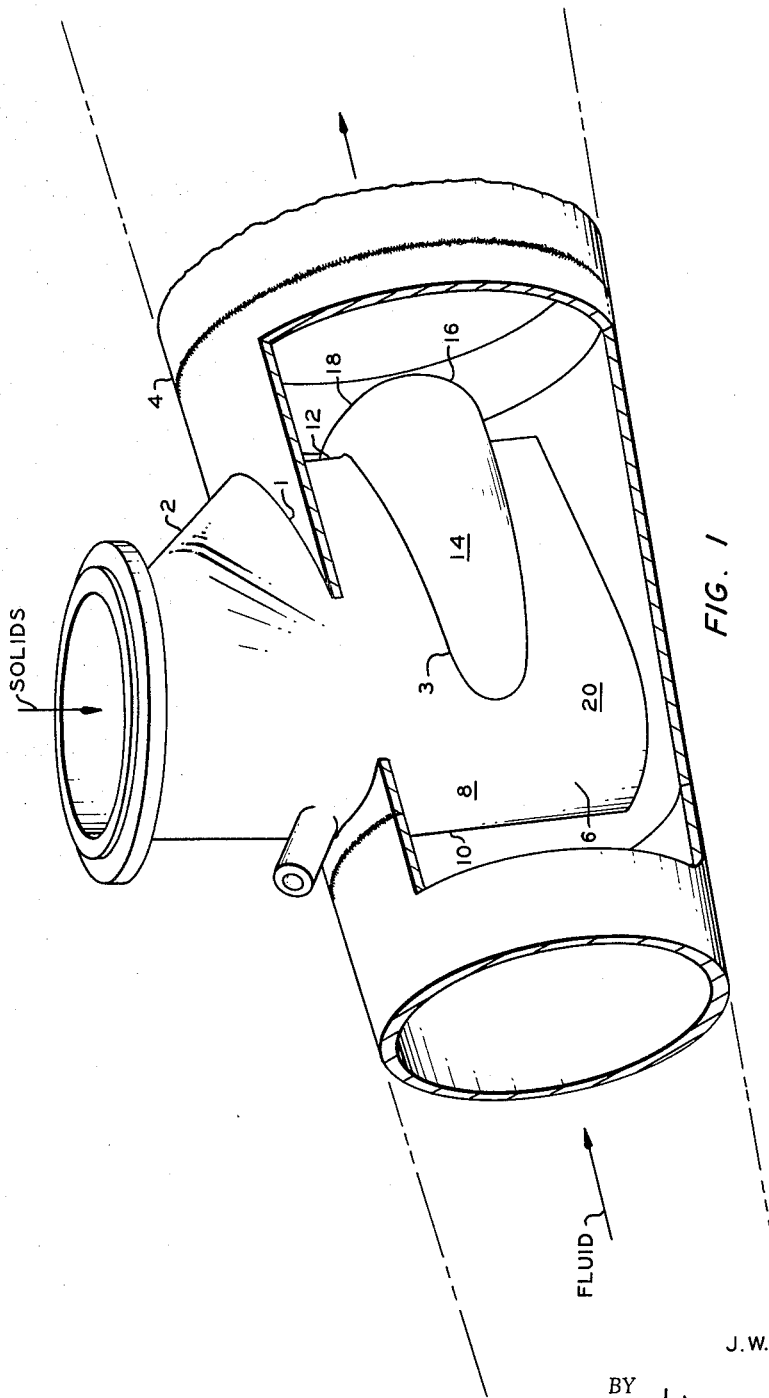
FIGURE 1 is a perspective view, in partial cross section, of the apparatus of this invention.

Referring now to FIGURE 1, particulate solid materials are conducted from conduit 2 to conveying conduit 4 by means of ejector device 6 positioned in conduit 4 with the inlet thereof communicating with conduit 2 and the outlet opening in a downstream direction concentrically with conduit 4. Conduit 4 can have any configuration as desired, but generally will have circular cross section and preferably will taper along its length as shown. The total angle of taper is usually between about 5 and 15 degrees. A conveying fluid is introduced into the upstream end of conduit 4, the smaller end of the tapered conduit. Conduit 2 is connected to a source of particulate solid materials, not shown, and can have any configuration desired which will taper to a streamlined cross section, later to be described, when it meets conduit 4 at juncture 1. Ejector device 6 has streamning configuration and comprises hollow member 8 of airfoil or teardrop cross section as does juncture 1. Member 8 may be a separate conduit or an extension of conduit 2 inserted into conduit 4. Member 8 is positioned in conduit 4 with the leading edge 10 directed upstream and the trailing edge 12 directed downstream and the vertical axis thereof aligned on a diameter of conduit 4. The top of member 8, which is opened for communication with conduit 2, is rigidly attached to conduit 4 at juncture 1. The bottom of member 8, which is closed, is in snug relation with the interior of conduit 4 directly opposite juncture 1. Streamlined hollow member 14 can have any configuration suitable for use with the configuration of conduit 4, but generally will have a circular type cross section. Member 14 as shown in use with tapered circular conduit 4 has elliptical cross section and tapers along its length. Member 14 attaches to and communicates with the interior of member 8 in a manner similar to that of an airplane engine nacelle. Elliptical outlet 16 of member 14 extends slightly beyond the trailing edge 12 of member 8 as indicated at 18. The taper of the length of member 14 converges it about each side of member 8 and is attached thereto at juncture 3. Reservoir or stagnant area 20 is defined in the lower portion of member 8 under member 14. In operation, fluid flowing through conduit 4 is vertically proportioned by the leading edge 10 of member 8 and allowed to recombine as member 8 tapers to trailing edge 12. The expanding taper of member 14 toward outlet 16 horizontally proportions the air flow to make it uniform along the vertical. The extension of outlet 16 beyond the trailing edge 12 of member 8 permits the annular flow of air to be completely uniform when it passes outlet 16 and the solids are suspended within the interior of the uniform annular air flow.

Figure 2:
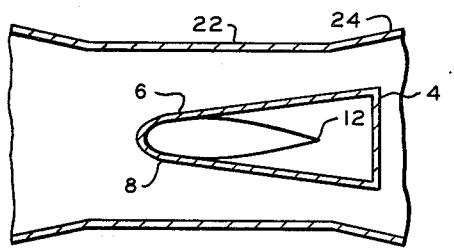
FIGURE 2 is a top section showing a modified construction of the apparatus of this invention.

In FIGURE 2 ejector device 6 is shown in top cross section indicating hollow member 8 of airfoil cross section and member 14 having tapering sides which converge about member 8 from trailing edge 12 thereof. In this embodiment ejector device 6 is positioned in a venturi section 22 of a cylindrical conduit 24.

Figure 3:
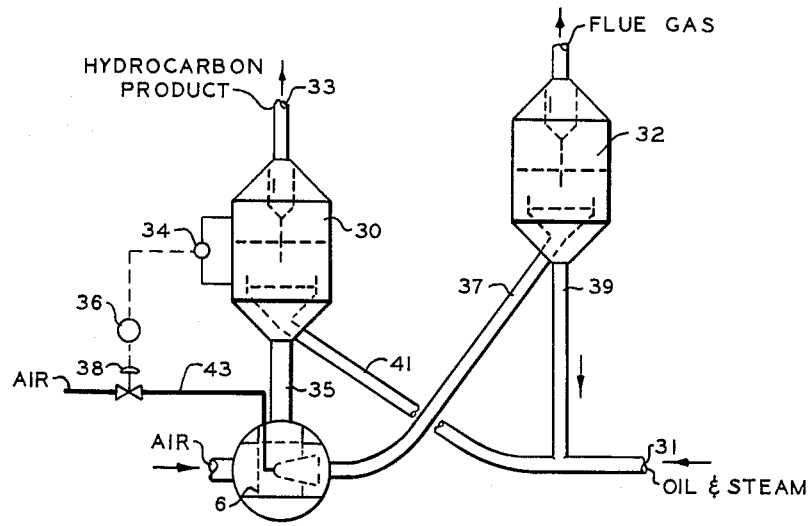
FIGURE 3 is a schematic view of a catalytic hydrocarbon cracking process incorporating this invention.

In FIGURE 3 a suitable hydrocarbon feed to be cracked is introduced to reactor 30 by conduit 31. In reactor 30 the hydrocarbon feed is contacted with cracking catalyst under conditions to obtain the hydrocarbon cracking. The cracked hydrocarbons are removed by conduit 33. Spent catalyst is removed from reactor 30 by conduit 35 into conduit 37 containing a fluid, such as air, for suspension of the catalyst therein and transportation thereof to regenerator 32. In regenerator 32 the catalyst is fortified by contact with high temperatures. Regenerated catalyst is removed from regenerator 32 by conduit 39 combined with steam and oil and introduced into reactor 30 by conduit 41. As shown, in the enlarged circular area of the juncture of conduit 35 and conduit 37, commonly called a riser, ejector device 6 is positioned therein in accordance with FIGURE 1, forming a channel from conduit 35 into concentric relationship with conduit 37. A fluid, such as air, may be introduced into ejector 6 at the point of direction change of the solids via conduit 43. Also, a fluid can be introduced at or above juncture 1 into the solids to prevent bridging. The quantity of air introduced by conduit 43 is controlled in response to catalyst bed level in reactor 30, as indicated by level controller 34 operatively connected to reactor 30 which produces a signal indicative of the catalyst level within reactor 30 and transports this signal to controller 36 which compares it to a desired catalyst bed level and produces another signal which is operatively connected to valve 38 in conduit 43 for manipulation thereof and regulation of the flow of air through conduit 43. Controllers 34 and 36 are conventional controllers, well known and used in the art.

The configuration of ejector device 6 within the fluid conduit provides streamlined and uniform flow of fluid about the point of solids injection. The baffling completely across the fluid flow eliminates an open path for increased flow under the point of injection as is common in the prior art when the point of injection is an elbow conduit suspended into the fluid flow. Also, in this regard, the prior art devices as suspended within the fluid conduit permit movement thereof due to changes in temperature and fluid flow rates which cause misalignment of the solids injection. The extension of the solids outlet beyond the baffling means permits the fluid flow to become uniform in an annular area prior to suspending the solids therein which eliminates vertical movement of the solids that direct them toward the walls of the conduit. The reservoir defined below the channel for solids flow permits a cushion of the solids to collect therein which the moving solids passing through the ejector device contact on changing directions and thus reduces attrition thereof which is present in the prior art when the solids contact rigid surfaces.

EXAMPLE

In a conventional dense bed downflow catalytic cracking system of the general type shown, for instance, in Petroleum Refiner, volume 31, No. 9 (September 1952), page 302, a hydrocarbon oil is cracked catalytically. In such a process the apparatus of this invention is employed in an inclined portion of the spent catalyst riser, i.e., the line transferring spent catalyst from the reactor to the regenerator. The catalyst employed is natural catalyst which is an acid-treated bentonite consisting primarily of silica-alumina clay of the montmorillonite type. It has a United States standard sieve size of 90 to 400 mesh. The feed stock being catalytically cracked in this example is a mixture of virgin gas oil, i.e., a mixture of gas oil from thermally topped western Kansas crude plus heavy gas oil recovered from vacuum distillation of the topped crude. The mixed gas oil has a boiling range of from 400 to 1000° F. The temperature of the oil feed to the reactor riser is about 700° F. The conditions employed are given in the following table:

*Table I (Typical)*

Reactor:
    Pressure, p.s.i.g. _____ 12.
    Temperature, °F. _____ 900.
    Catalyst/oil weight ratio _____ 5:1.
    Weight of oil/hr. per weight catalyst
      in reactor _____ 6:1.
Regenerator:
    Pressure, p.s.i.g. _____ 7.
    Temperature, °F. _____ 1,050.
    Catalyst residence time, min. _____ 12.
Spent catalyst pickup downcomer:
    Circulation, tons/min. _____ 20.
    Diameter of downcomer _____ 3 ft., 6 in.
    Temperature, °F. _____ 900.
    Catalyst density, lbs./cu. ft. _____ 33.
    Catalyst velocity at outlet, ft./sec. ___ 2.
Transfer line:
    Temperature, °F. _____ 910.
    Pressure, p.s.i.g. _____ 18.
    Catalyst density, lbs./cu. ft. _____ 0.9.
    Superficial air velocity, ft./sec. _____ 29.
    Primary air, s.c.f. min. _____ 35,000.
    Secondary air, s.c.f. per s.c.f. primary
      air _____ 0.15.
    Taper of conduit 37 _____ About 10°.
    Large diameter of 37 _____ 5 ft., 4 in.
    Length of tapered section _____ 27 ft., 8¾ in.
Ejector device:
    Member 8—
      Height (vertical) _____ 3 ft., 6 in.
      Length _____ 4 ft., 0 in.
      Maximum width _____ 1 ft., 1¾ in.
    Member 14—
      Outlet width, horizontal _____ 2 ft., 6 in.
      Outlet width, vertical _____ 1 ft., 3 in.

When operating according to this example according to the invention, the total erosion in conduit 4 is lessened and the erosion that does occur is spread out over a wider area, thus extending the useful life of the conduit 4. Also, the attrition of the catalyst is minimized.

Various modifications of this invention will be apparent to one skilled in the art which can be made and followed without departing from the spirit and scope of this invention.

That which is claimed is:

1. An apparatus for suspending and conveying particulate solid materials in a flowing fluid stream comprising, in combination, a first conduit;
   means for introducing and flowing a fluid into and through said first conduit;
   a second conduit communicating with said first conduit at a juncture;
   means for introducing and flowing a particulate solid material into and through said second conduit;
   an ejector means in said first conduit communicating with said second conduit, said ejector means comprising a third streamlined conduit, one open end rigidly attached at said juncture and the other closed end in snug relation with said first conduit opposite said juncture;
   a fourth streamlined conduit meeting and communicating with said third conduit, said fourth conduit being concentric with said first conduit, thus providing a channel for said materials from said second conduit into concentric relationship with said first conduit, and a reservoir defined by said third conduit below said fourth conduit.

2. An apparatus for suspending and conveying particulate solid materials in a flowing fluid stream comprising, in combination, a tapered circular conduit;
   means for introducing said flowing fluid into the smaller end of said tapered conduit;
   a second conduit communicating with said tapered conduit at a juncture;
   means for introducing flowing particulate solid materials into said second conduit;
   solid ejector means in said tapered conduit communicating with said second conduit, said ejector means comprising an extension of said second conduit of airfoil cross section, extending into said first conduit, the leading edge of said extension facing the fluid flow; and a tapering third conduit communicating with said extension and extending beyond the trailing edge thereof; said ejector being adapted and aligned to suspend and direct the flow of particulate solids substantially parallel to and within said fluid flow.

3. The apparatus of claim 2 wherein said first conduit is cylindrical with a venturi section and said juncture is at said venturi.

4. A process which comprises passing a confined fluid stream of carrier fluid from a first point to a second point, providing at a point intermediate said first and second points a uniform annular flow of said fluid stream, introducing a stream of particulate solids substantially concentrically within said annular flow of said fluid stream, and maintaining a bed of stagnant solids below the stream of particulate solids immediately prior to said point of introduction.

5. In a process comprising passing a fluid stream through a conduit, and introducing particulate solids from a point outside said conduit concentrically within an annular flow of said fluid stream, the improvement comprising maintaining a bed of said solids stagnant beneath the point of direction change of said solids being introduced.

References Cited by the Examiner

UNITED STATES PATENTS

| 772,436 | 10/1904 | Shields | 302—57 |
|---|---|---|---|
| 2,695,265 | 11/1954 | Degnen | 302—51 |
| 2,789,868 | 4/1957 | May | 302—51 |
| 2,899,374 | 8/1959 | Gomory | 302—36 |
| 3,149,924 | 9/1964 | Cross | 302—25 |

SAMUEL F. COLEMAN, *Primary Examiner.*

ANDRES H. NIELSEN, *Examiner.*